United States Patent
Bennett et al.

(10) Patent No.: US 8,547,617 B2
(45) Date of Patent: Oct. 1, 2013

(54) QUANTUM LOGIC COMPONENT AND A METHOD OF CONTROLLING A QUBIT

(75) Inventors: Anthony John Bennett, Cambridge (GB); Richard Mark Stevenson, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 13/039,893

(22) Filed: Mar. 3, 2011

(65) Prior Publication Data

US 2011/0242632 A1    Oct. 6, 2011

(30) Foreign Application Priority Data

Mar. 30, 2010   (GB) .................................. 1005387.4

(51) Int. Cl.
  *G06E 3/00*   (2006.01)
(52) U.S. Cl.
  USPC .......................................... 359/107; 977/774
(58) Field of Classification Search
  USPC . 359/107–108; 356/365–368; 977/773–775, 977/778, 780–782, 784, 813, 816–817, 819, 977/821, 832, 901
  See application file for complete search history.

(56) References Cited

U.S. PATENT DOCUMENTS

| 6,988,058 | B1 | 1/2006 | Sherwin et al. |
| 2002/0196827 | A1* | 12/2002 | Shields et al. ................. 372/45 |
| 2011/0108743 | A1 | 5/2011 | Bennett et al. |

FOREIGN PATENT DOCUMENTS

| GB | 2 386 470 A | 9/2003 |
| GB | 2 439 595 A | 1/2008 |
| GB | 2 456 347 A | 7/2009 |
| GB | 2 460 666 A | 12/2009 |
| JP | 2007-329344 A | 12/2007 |

OTHER PUBLICATIONS

United Kingdom Search and Examination Report issued Aug. 2, 2010 in corresponding United Kingdom Application No. GB1005387.4.

Thomas E. Hodgson et al., "Decoherence-Protected Storage of Exciton Qubits Through Ultrafast Multipluse Control", Physical Review B, vol. 78, No. 16, 2008, pp. 165311-1 - 165311-12.

Avinash Kolli et al., "All-Optical Measurement-Based Quantum-Information Processing in Quantum Dots", Physical Review Letters, vol. 97, No. 25, Dec. 22, 2006, pp. 250504-1 - 250504-4.

G. Medeiros-Ribeiro et al., "Tuning Nanocrystal Properties for Quantum Information Processing", Physics of Semiconductors: 27th International Conference on the Physics of Semiconductors, No. 772, 2005, pp. 1475-1478.

Brendon W. Lovett et al., "Quantum Computing with Spin Qubits Interacting Through Delocalized Excitons: Overcoming Hole Mixing", Physical Review B, vol. 72, No. 11, 2005, pp. 115324-1 - 115324-9.

* cited by examiner

*Primary Examiner* — Stephone Allen
*Assistant Examiner* — Kimberly N Kakalec
(74) *Attorney, Agent, or Firm* — Oblon, Spivak, McClelland, Maier & Neustadt, L.L.P.

(57) ABSTRACT

A component comprising a qubit and a controller for said qubit, said component comprising a quantum dot and an excitation portion configured to produce a neutral exciton state in said quantum dot to form said qubit, the component further comprising a measuring unit to make an optical measurement relating to the orientation of said state, wherein said controller comprises voltage source coupled to electrical contacts configured to apply a modulated electric field across said quantum dot, wherein the modulation is faster than the decay time of said neutral exciton state.

20 Claims, 10 Drawing Sheets

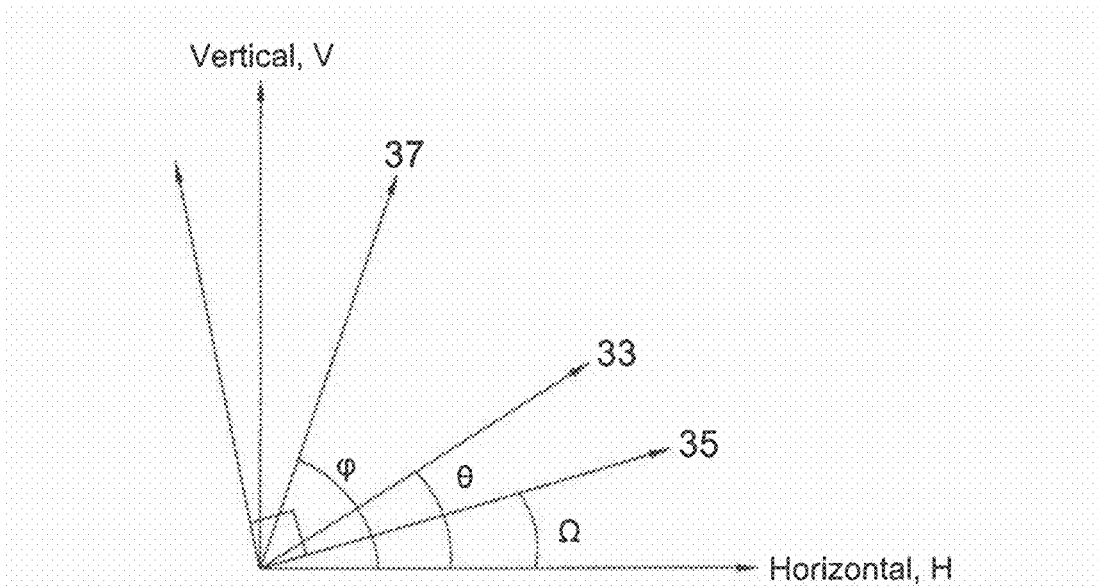
Fig. 3
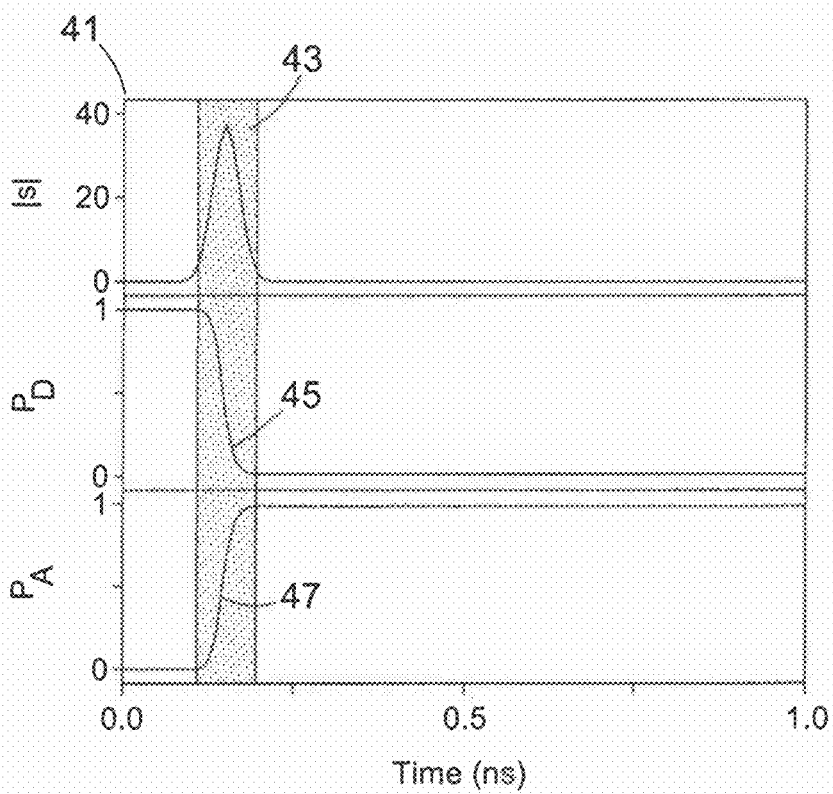
Fig. 4A
Fig. 4B
Fig. 4C

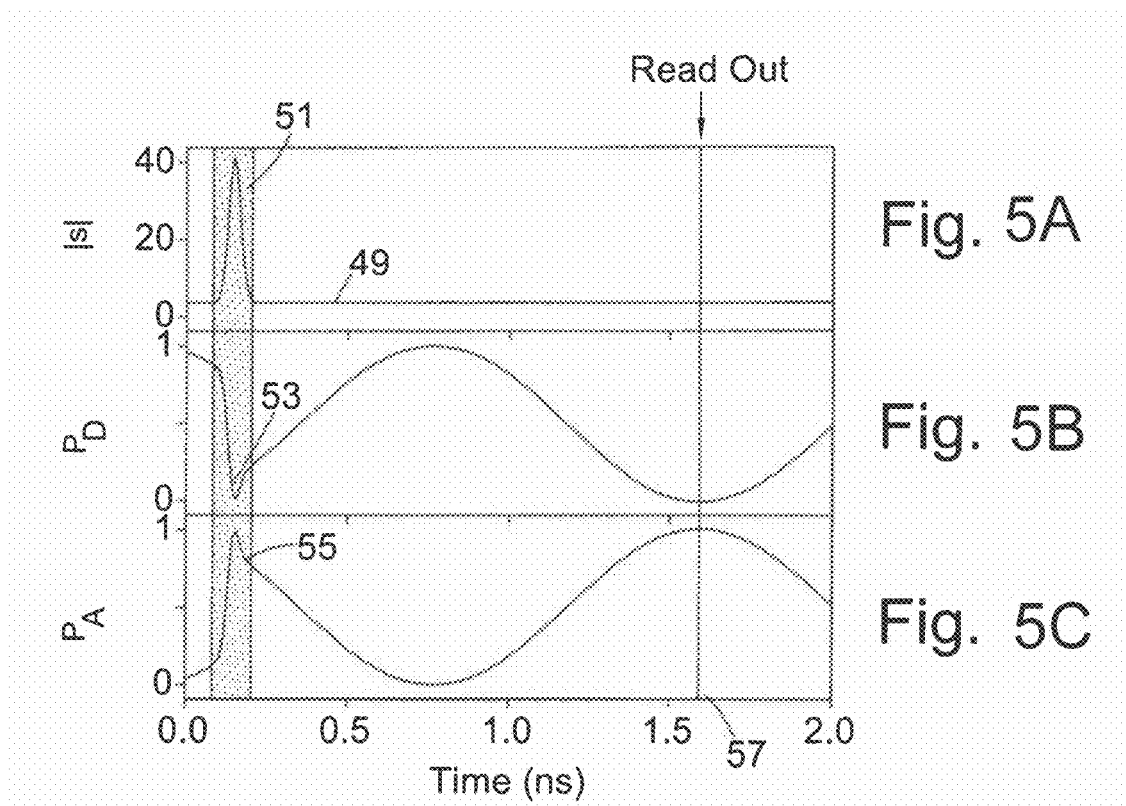
Fig. 5A
Fig. 5B
Fig. 5C
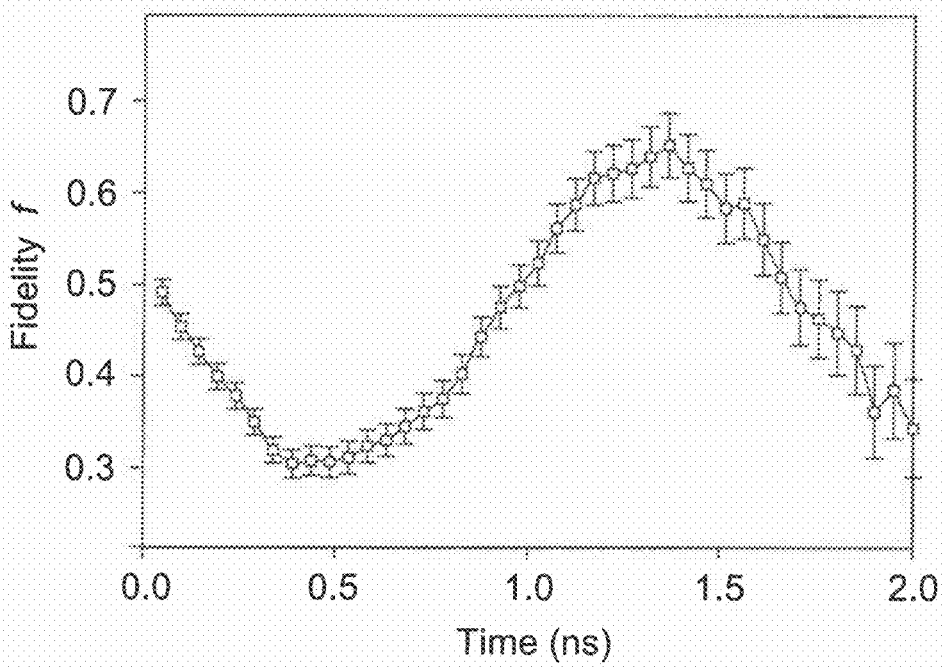
Fig. 6

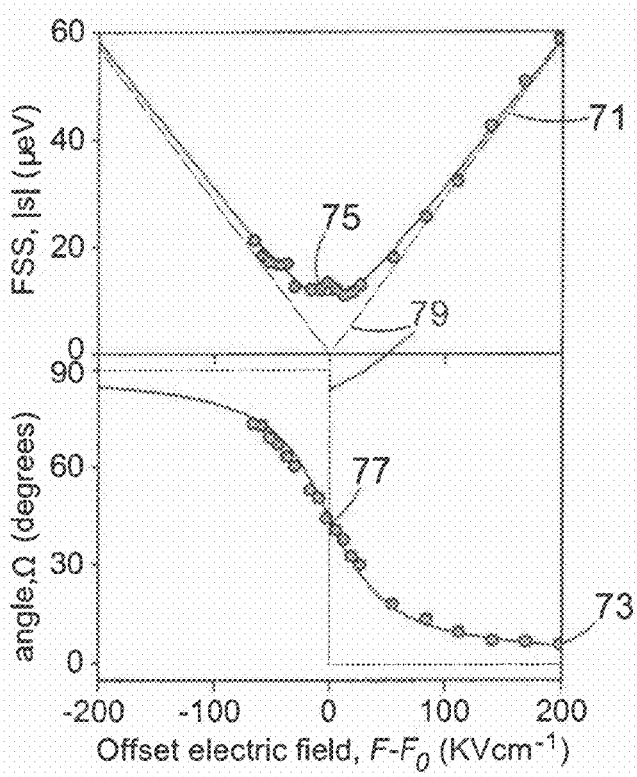
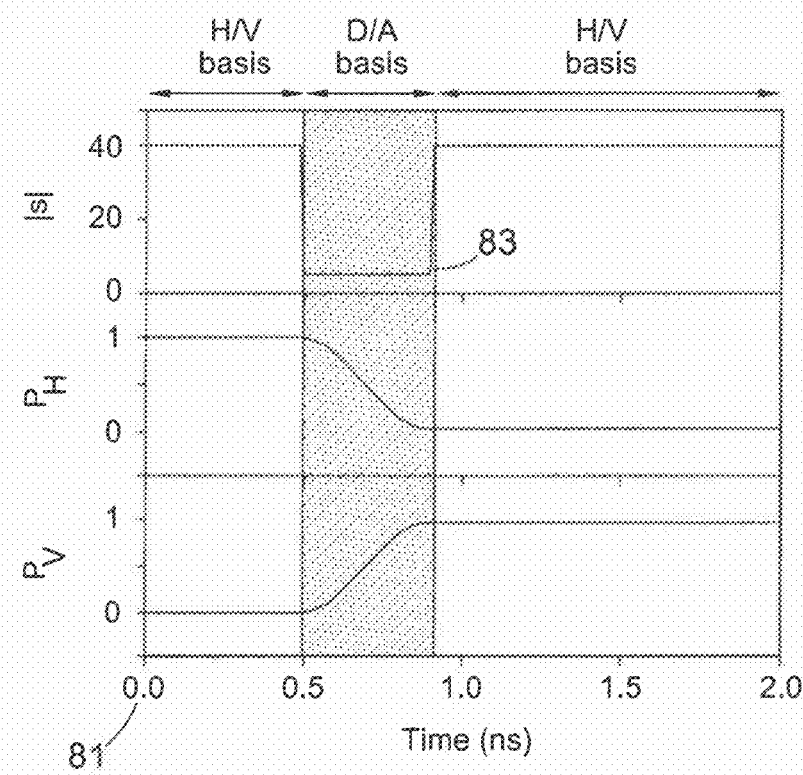

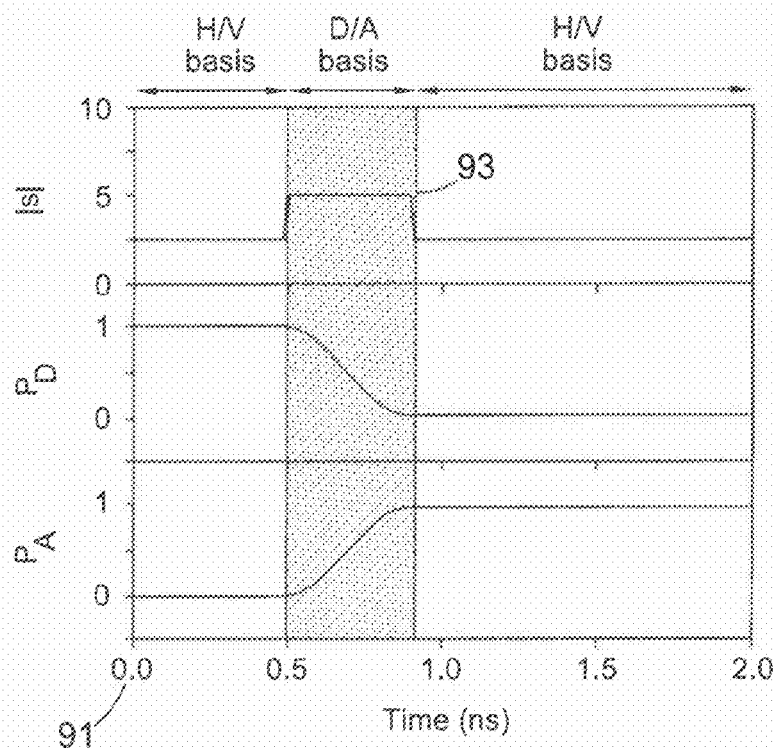
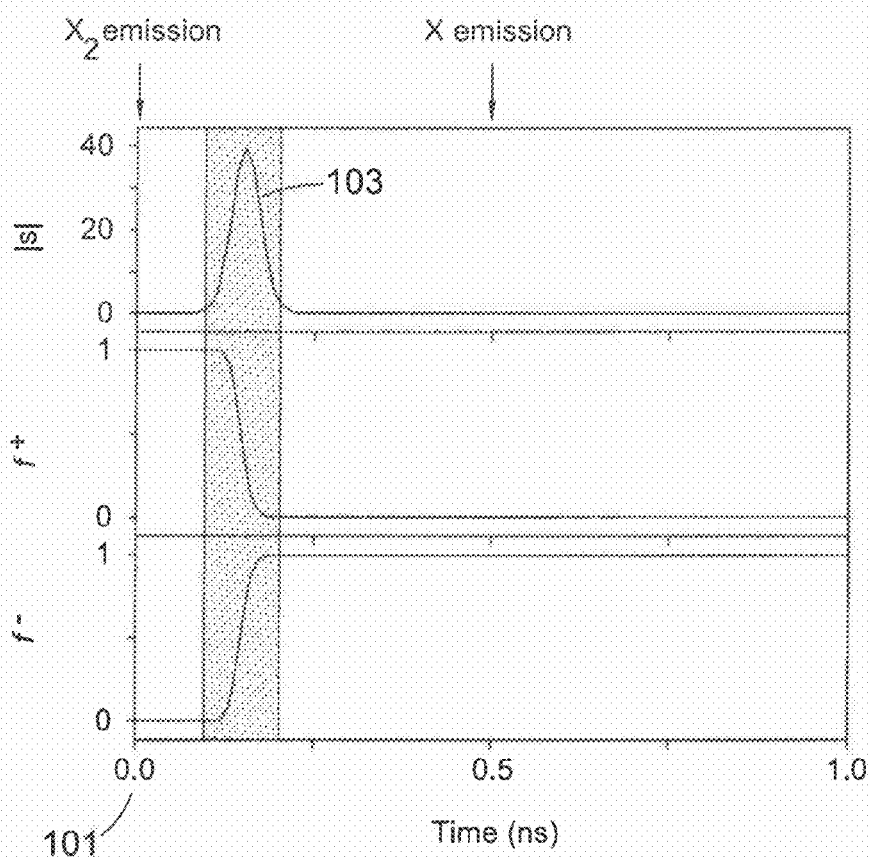

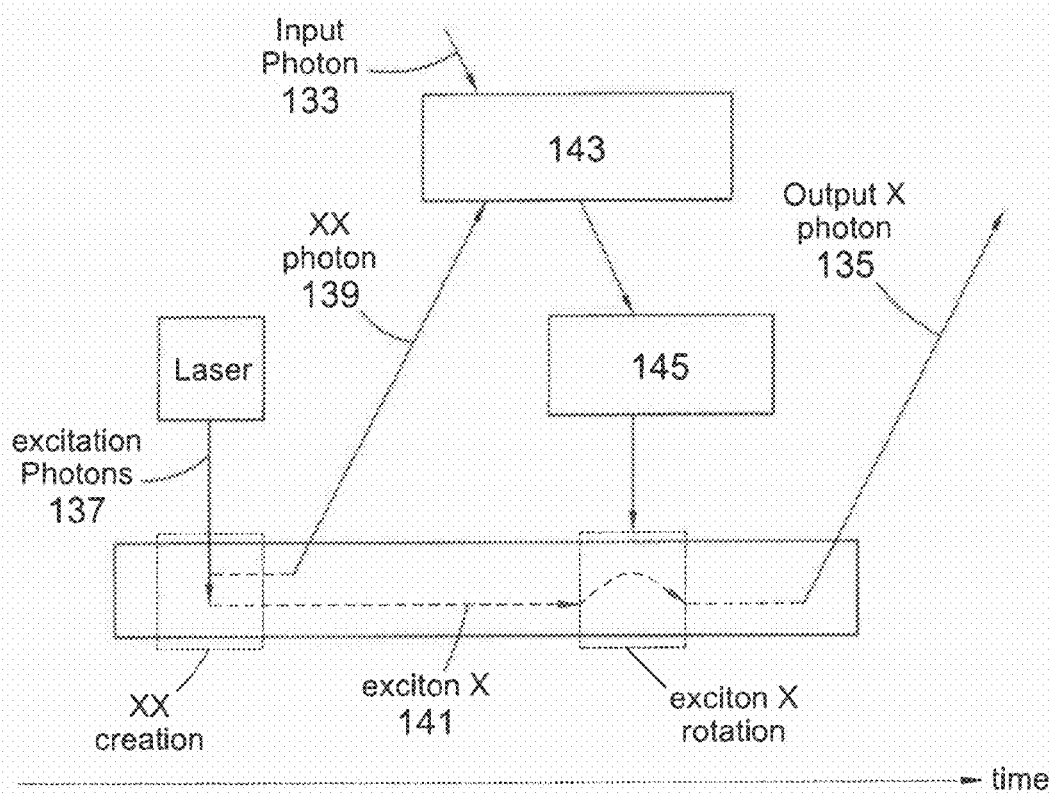
Fig. 13
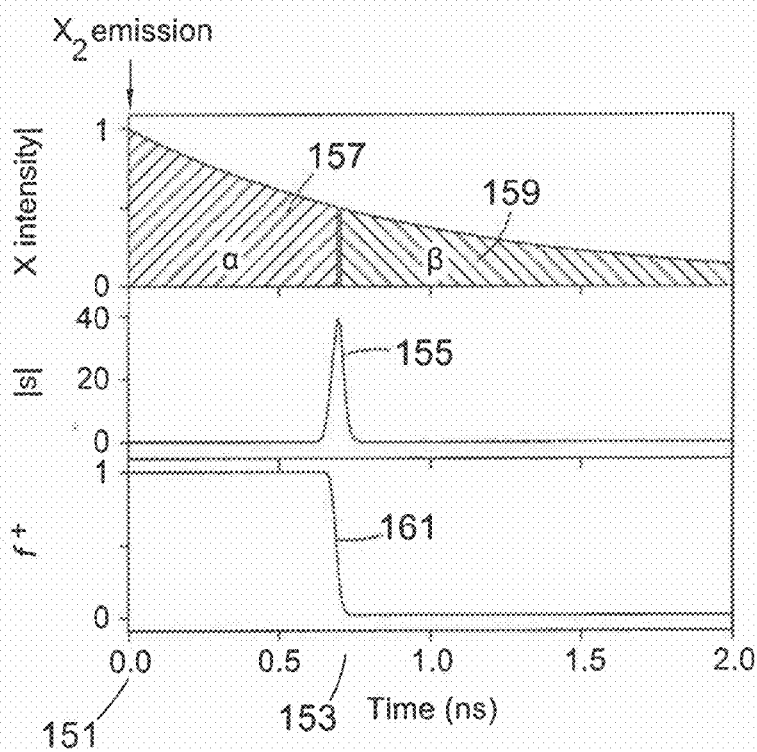
Fig. 14A
Fig. 14B
Fig. 14C

QUANTUM LOGIC COMPONENT AND A METHOD OF CONTROLLING A QUBIT

CROSS REFERENCE TO RELATED APPLICATIONS

This application is based upon and claims the benefit of priority from GB patent application number 1005387.4; the entire contents of which are incorporated herein by reference.

FIELD

Embodiments described herein generally relate to a quantum information component and method for controlling a qubit.

BACKGROUND

In the field of quantum cryptography, quantum imaging and quantum computing there is a need to produce pairs of photons. Such photons can be created from a cascade emission process in single quantum dots initially filled with two electrons and two holes, a "biexciton state". This state can emit "a biexciton photon" leaving one electron and one hole in a "(charge-neutral) exciton" state. This electron and hole then recombine to emit an "exciton" photon leaving the dot empty. Through control of the properties of the exciton state these two photons can be entangled.

When a quantum dot contains only one electron and one hole the spins of these particles are arranged in such as manner that that ensures photons emitted from their decay can have one of two orthogonal linear polarisations, with an energy separation known as the fine-structure splitting. Alternatively, the carriers can be arranged in a superposition of these states, which can the thought of as a qubit. Quantum dots with small fine-structure splitting can be used to generate entangled photon pairs, or to store a qubit in this configuration. In the case where the fine-structure splitting is zero this superposition, once prepared, will persist until the carriers recombine and a photon is emitted. However, if the fine-structure splitting is finite the superposition evolves with time.

BRIEF DESCRIPTION OF THE DRAWINGS

The present invention will now be described with reference to the following non-limiting embodiments in which:

FIG. 3 is a schematic showing the angles of excitation and detection relevant as measured with reference to a laboratory axis;

FIG. 4A is a plot of the fine structure splitting of a quantum dot varied over time where the initial splitting is 0, FIGS. 4B and 4C show how a superposed state varies with splitting projected onto the diagonal and antidiagonal axes of FIG. 3 respectively;

FIG. 5A is a plot of the fine structure splitting of a quantum dot varied over time where the initial splitting is non-zero, FIGS. 5B and 5C show how a superposed state varies with splitting projected onto the diagonal and antidiagonal axes of FIG. 3 respectively;

FIG. 6 is a plot showing the fidelity f+ of the entangled state with the $(X^H X_2^H + X^V X_2^V)$ entangled state, emitted by a dot as a function of time for a dot with a fine-structure splitting of 2.5 μeV;

FIG. 7A shows experimental results of the fine structure splitting against applied vertical electric field and FIG. 7B shows the rotation angle of states for an applied vertical electric field;

FIG. 8A is a plot of the fine structure splitting of a quantum dot varied over time where the initial splitting is non-zero, FIGS. 8B and 8C show how a state formed as a pure eigenstate varies with splitting projected onto the horizontal and vertical axes of FIG. 3 respectively;

FIG. 9A is a plot of the fine structure splitting of a quantum dot varied over time where the initial splitting is non-zero, FIGS. 9B and 9C show how a state formed as a pure eigenstate varies with splitting projected onto the diagonal and antidiagonal axes of FIG. 3 respectively;

FIG. 10A is a plot of the fine structure splitting of a quantum dot varied over time which has been excited to a biexciton state, FIGS. 10B and 10C show how the fidelity of the entangled state changes over time;

FIG. 13 is a schematic of a component of the present invention configured for teleportation operation;

FIG. 14 is a schematic of a component in accordance with an embodiment of the present invention configured as a quantum controlled-NOT (CNOT) gate;

DETAILED DESCRIPTION

Figure 1:
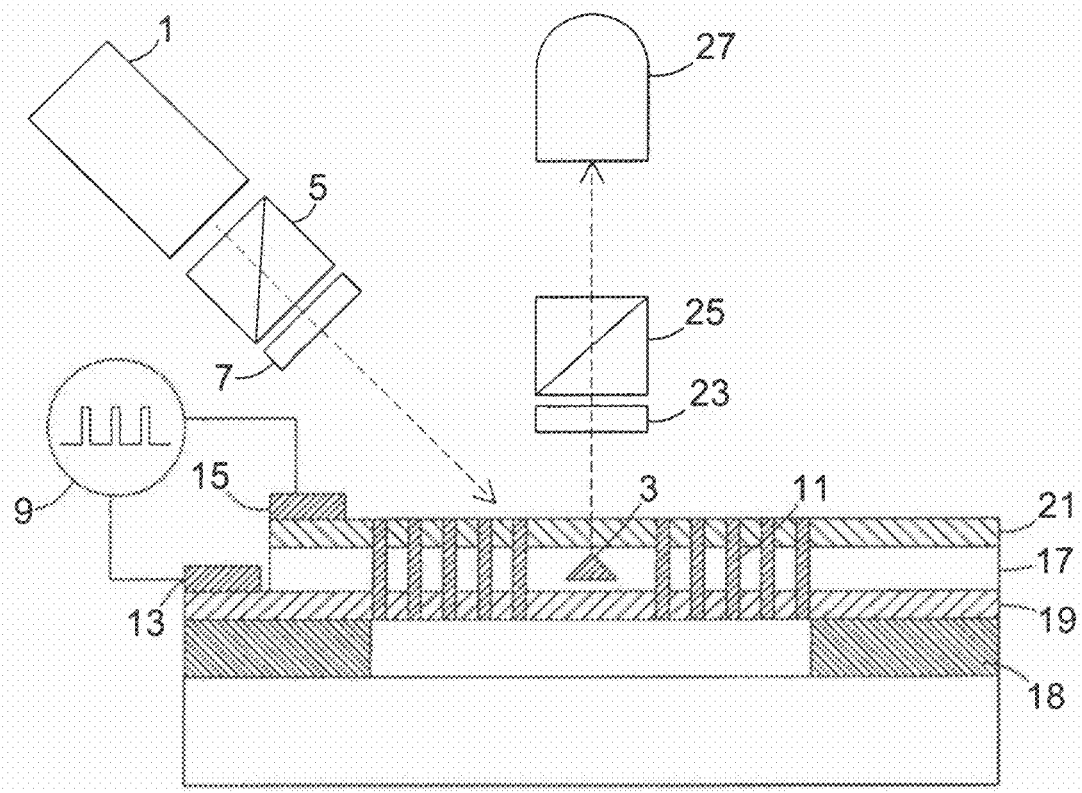
FIG. 1 is a schematic of a component in accordance with an embodiment of the present invention.

According to one embodiment a component is provided comprising a qubit and a controller for said qubit, said component comprising a quantum dot and an excitation portion configured to produce a neutral exciton state in said quantum dot to form said qubit, the component further comprising a measuring unit to make an optical measurement relating to the orientation of said state, wherein said controller comprises voltage source coupled to electrical contacts configured to apply a modulated electric field across said quantum dot, wherein the modulation is faster than the decay time of said neutral exciton state.

By providing a dynamic change to the fine-structure splitting it is possible to control the state of the superposition, and to properly utilise such a state for quantum information systems. Certain features are common to all proposals for quantum computing, regardless of the physical implementation. These are techniques to initialise the qubit in a well defined state. A further requirement is that the qubit must remain coherent for long enough for as many as possible operations to be carried out on it. The final state of the qubit must then be read with high certainty.

The above component can be a component in a solid state quantum computer. It can be used as a controlled-NOT gate and a controlled rotation gate. It can also be used to control a Bell state emitted by a quantum-dot entangled-photon-pair source for applications in teleportation and quantum repeaters.

Control in the present invention can be on a sub 100 ps timeframe. In one embodiment, the component is all electrical and thus suitable for miniaturisation. The present invention is also scalable and multiple quantum dots could be addressed by separate contacts. Coherent interaction between states is independent of temperature (up to 80K) and unaffected by high excitation powers. Therefore, the component of the present invention is robust.

In a mode of operation, said controller is configured to apply a predetermined phase change to said state; the amplitude of said modulation being selected such that said phase change occurs over a time scale faster than or shorter than the decay time of said exciton state. In one embodiment, a bright optical beam would be used to excite a single empty quantum dot in to a predetermined superposition of two exciton states. Dynamic changes to the energy difference between the two components of the exciton state would then be made, to manipulate the superposition. The qubit is located within a single quantum dot.

In an embodiment, the fine-structure splitting is below the radiative bandwidth of the exciton state at the time when the superposition is created.

The fine-structure splitting may be below 10 μeV at the time the exciton state is created. A fine structure splitting of this magnitude or lower will allow entanglement to be observed through time selection using a fast detector. If a slow detector is used, then in an embodiment, the fine structure splitting will be comparable to the exciton linewidths, which varies from dot to dot.

In one embodiment, the voltage modulator is configured to apply a bias with an amplitude such that the magnitude of the fine structure splitting of the quantum dot is modulated and the eigenstates of the quantum dot are constant in time. At high values of the fine structure splitting, further rotation of the eigenstates is inhibited. In a further embodiment, the voltage modulator is configured to apply a bias with an amplitude such that the magnitude of the fine-structure splitting of the quantum dot is modulated and the exciton eigenstates are rotated.

The above has discussed an exciton state which is a superposition of states. However, in a further embodiment, said excitation portion is configured to produce a pure eigenstate and said controller varies the state by rotating the eigenstates of said quantum dot.

In an embodiment, the optical excitation is at the same energy as the exciton states. The excitation may also be electrical excitation. For example, in electrical excitation carriers are supplied via conducting contacts to an external current source.

The measuring unit which performs the read-out of the system may comprise a polariser arranged to make a polarisation sensitive measurement. In an alternate arrangement said measuring unit comprises a laser beam resonant with the exciton state and directed to said quantum dot and a photodetector configured to determine if the laser has been affected by the quantum dot.

In an embodiment an entangled photon source is a source based on a quantum dot which operates using biexciton decay. The advantage of semiconductor quantum dots is that their fabrication techniques are compatible with existing commercial production techniques. Thus, the component may be configured to control the state of the emitted entangled photons.

In another embodiment, the quantum dot would be excited to the configuration of two electrons and two holes, after which it would decay to the exciton state, by emission of a "biexciton" photon. The polarisation of said biexciton photon would be measured to determine the state into which the exciton state is projected. A dynamic change would be made to the fine-structure splitting of the exciton state, manipulating the superposition. A second photon would finally be emitted by decay of said exciton state, whose polarisation state would be determined by the state of the biexciton photon emitted and the operation applied to the superposition stored in the exciton state.

In a quantum dot which emits entangled photons due to biexciton decay, the entangled state may be determined from the delay time between the photon which is emitted due to biexciton decay and the photon which is emitted from decay of the intermediate exciton. Alternatively, since the biexciton decay time can be very short compared to the exciton decay time, a timer may be configured just to measure the emission time of the photon emitted due to the exciton decay which follows the biexciton decay. Thus, said measuring unit may comprise a photon detector and a timer.

The voltage modulation occurs faster than the time it takes for the state to radiatively combine. For an InAs/GaAs quantum dot this radiative lifetime may be a nanosecond in the absence of any cavity effects. Thus, the modulation of the magnitude of the fine-structure splitting (hereafter denoted s) would ideally take place in a time scale below 500 ps. Operations occurring on a faster timescale would enable many operations to occur within the lifetime.

In the following simple operations will be described that can be carried out on a qubit stored in the exciton state using a single pulse or sometimes multiple pulses. Multiple pulses can be used in a physical realisation to enable more complex operations to be performed on the stored qubit.

This requirement could be relaxed by placing the dot within a photonic crystal designed to reduce the optical modes into which a photon can be emitted. Such frustration of photon emission has been shown to lead to 1-2 orders of magnitude increase in the radiative lifetime. In an embodiment, the quantum dot is located within a photonic crystal that increases the radiative lifetime.

A further requirement is that the change in the field be such that carriers are retained in the dot for the duration of the operation. If the dot is placed in a device in which it is surrounded by only GaAs then fields of approximately 50 KVcm$^{-1}$ will result in tunnelling of carriers from the device. Thus it may be advantageous to place tunnelling barriers on one or both sides of the dot, which would consist of a higher-bandgap material, such as an AlGaAs alloy. Unpublished patent application number GB 0919532.2, which is herein incorporated by reference discloses designs for devices that could withstand voltages up to 500 KVcm$^{-1}$ without carriers tunnelling from the dot.

Generally, the quantum dot is provided in a structure comprising a plurality of layers and the voltage modulator is configured to apply a vertical electric field which is perpendicular to the plane of said layers. In a further embodiment, a lateral electric field is applied in the plane of the dot, to change the fine-structure splitting. As it is widely believed that the fine-structure splitting arises from the differing in-plane confinements of the exciton states, it is expected that this in-plane field might perturb one state more than the other.

The controller may also comprise a magnetic field generator configured to apply a vertical magnetic field configured to manipulate the fine-structure splitting of said quantum dot.

In an embodiment, a component in accordance with an embodiment may be configured for teleportation of a quantum state, the component further comprising an independent photon source configured to produce a photon, wherein the excitation portion is configured to excite a biexciton in said quantum dot, the component further comprising a photon mixing unit configured to mix the photon from the independent source with the photon emitted from bi-exciton decay such that a Bell state measurement is performed on the two photons, said photon mixing unit further comprising an output unit configured to output a signal to said controller indicating the Bell state, said controller being configured to change the state of said neutral exciton to that of said independent photon on the basis of the signal received from the photon mixing unit.

In an embodiment, a component in accordance with an embodiment of the present invention may be configured as a CNOT gate, wherein said excitation unit is configured to excite a biexciton in said quantum dot, said control unit is configured to apply a modulating pulse to apply a phase change of pi to the neutral exciton state, such that the polarisation state of the exciton photon is entangled with the emission time, and measurement of the time and polarisation of the exciton photon determines the polarisation of the biexciton photon.

According to an embodiment, a method of controlling a qubit in a quantum dot is provided, said method comprising forming a qubit by providing a neutral exciton state, controlling said qubit by applying a modulated electric field across said quantum dot, wherein the modulation is faster than the decay time of said neutral exciton state; and making an optical measurement relating to the orientation of said state.

FIG. 1 shows a component in accordance with an embodiment of the present invention.

The component is formed on a substrate and comprises a quantum dot 3. The terms 'above' and 'below' will be defined with respect to the order of growth of the layers, with a layer lying below the quantum dot being provided on the substrate side of the quantum dot and a layer above the quantum dot being on the opposing side of the quantum dot to the substrate. Said quantum dot is located in an intrinsic region 17. A p-type doped layer 19 is located below said intrinsic region 17 and an n-type doped layer 21 above said intrinsic region such that said intrinsic region 17 is located between said n and p type layers 19 and 21. Of course, the order of the n and p type layers may be reversed.

Electrical contacts 13 and 15 are connected to the n and p type layers 21 and 19 such that a vertical field can be applied across quantum dot 3. Voltage modulator 9 is connected to contacts 13 and 15 such that a modulated voltage may be applied across quantum dot 3.

In this embodiment, the quantum dot 3 is formed in a photonic crystal comprising a regular array of etched holes 11 which extend vertically through said intrinsic region 17. The photonic crystal acts to reduce the radiative recombination rate of the dot.

To fabricate the component of FIG. 1, the quantum dots 3 are grown in the middle of a 100-200 nm thick layer of GaAs 17. Underlying the GaAs is a layer of AlGaAs which acts as a sacrificial layer consisting of 100-1000 nm of $Al_xGa_{1-x}As$ which may have composition of x=0.9-1.0. After the photonic crystal is defined in the GaAs layers using standard techniques, such as electron-beam lithography to define the crystal pattern and etching to transfer the pattern into the GaAs. This etch will be at least as deep as the GaAs layer and will reach the AlGaAs layer. The AlGaAs layer may then be selectively etched away beneath the crystal by exposure to, for instance, dilute hydrochloric acid which does not etch GaAs. Away from the crystal the AlGaAs layer will not be etched and will support the crystal. Thus the crystal is suspended.

The component further comprises a bright laser 1 which is directed through a linear polariser 5 and waveplate 7 towards said quantum dot and used to excite a quantum dot 3. In one embodiment, the quantum dot is excited into a superposition of the neutral exciton states, with said superposition being determined by the linear polarisation of the laser, which can be controlled with a linear polariser 5 and a waveplate 7. How this is achieved will be explained later with reference to FIGS. 4, 5, 8 and 9.

This could be achieved using a bright laser with an energy equal to the energy of the exciton states, whereby one photon from the laser can create one electron-hole pair in the exciton state directly. The polarisation of the laser setting the polarisation of the initial state.

Alternatively, the laser may be at an energy equal to the energy of the exciton state plus an integer number of phonon energies (phonon being a vibration in the semiconductor lattice). For GaAs the (longitudinal optical) phonon energy is 36 meV at 4K and in InAs it is 28 meV, and either can be employed here. Quantum dots can be readily excited by using lasers tuned to the energy of (Exciton+phonon). Thus when a photon from the laser is absorbed and a phonon in the semiconductor destroyed an exciton is created in the dot, and the total energy is conserved. Again through control of the polarisation of the laser used for excitation of the dot the initial state created can be controlled.

Once charges are stored in the quantum dot a voltage modulator 9 is used to manipulate the fine-structure of the quantum dot as described with reference to FIGS. 2, 4, 5, 8 and 9.

When the exciton decays a photon is emitted. The state of the exciton may be determined from a polarisation measurement of the photon which is emitted. In this embodiment, the component further comprises a polarisation sensitive detection system, comprising a waveplate 23, a polariser 25 and a detector 27. Said waveplate 23, polariser and detector 27 being arranged such that an emitted photon passes through the waveplate 23, then the polariser 25 and then into detector 27.

Figure 2:
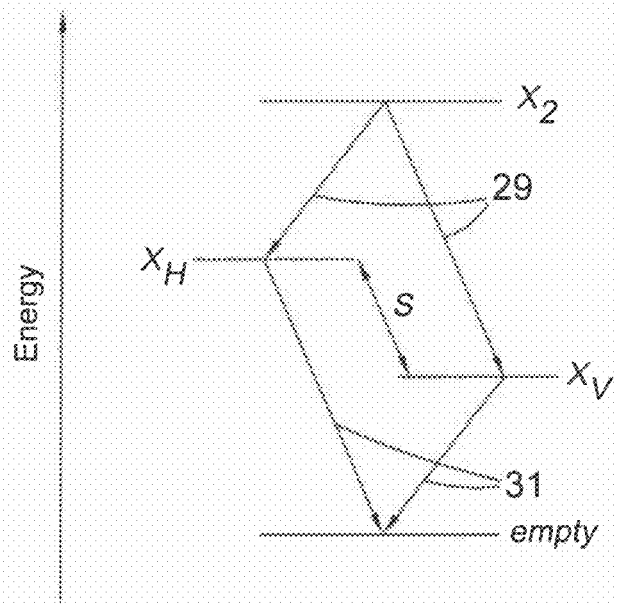
FIG. 2 is a schematic of the energy levels in a quantum dot.

FIG. 2 shows the relevant energy levels of a quantum dot. When the dot contains two electrons and two holes it is in the biexciton, $X_2$ state. After emission of one biexciton photon 29 it will contain one electron and one hole in the neutral exciton (X) in which the spins are arranged into two eigenstates which are, without loss of generality, orthogonally polarised at different energies. When this exciton state recombines a photon 31 will be emitted with polarisation given by the X state at the time of emission.

In the frequently studied system of self-assembled InAs quantum dots grown on GaAs, the neutral exciton states $X_H$ and $X_V$ are linearly polarised, typically parallel to and perpendicular to, the crystal axes of the semiconductor. In addition, because of the physical properties of the semiconductor and anisotropy in the size, shape and composition of the dot, these two eigenstates will have different energy. The energy difference between them is called the fine structure splitting and is denoted s.

The exciton state can be in a superposition of $X_A$ and $X_B$ which can be represented as:

$$\Psi(t)=\cos(\theta)|X_H\rangle+\sin(\theta)|X_V\rangle \quad (1)$$

The coefficients in front of each component of the state have the property $\sin^2(\theta)+\cos^2(\theta)=1$. Control of the angle θ can be achieved by rotating the polarisation of a bright laser beam used to excite the dot 33 (orientated with respect to Horizontal and Vertical laboratory axes in FIG. 3). In general the axes of the dot may be aligned at any angle Ω, 35. In a dot excited in this superposition the two components of the exciton state are at different energies (separated by s) will acquire a phase difference, where the constant C ensures normalisation of the final state.

$$\Psi(t) = C\left[\cos(\theta)|X_H\rangle + \exp\left(\frac{ist}{\hbar}\right)\sin(\theta)|X_V\rangle\right] \quad (2)$$

More generally, where $s(\tau)$ describes how the fine-structure splitting changes as a function of time, the expression (3) is obtained:

$$\Psi(t) = C\left[\cos(\theta)|X_H\rangle + \exp\left(\frac{i}{\hbar}\int_{time=0}^{time=t} s(\tau) \cdot d\tau\right) \cdot \sin(\theta)|X_V\rangle\right] \quad (3)$$

Thus, by controlling the $s(\tau)$ the final state of the superposition at a time t can be controlled. More precisely, the final state at a later time t is determined by the area under a plot of $s(\tau)$ versus $\tau$.

It is possible to measure this phase. A measurement of the final state along the Vertical direction determines the probability of the system being in the $X_V$ state at the time, t which is $P_V$. This is given by the coefficient in front of the $|X_V\rangle$ state in equation (3) multiplied by its complex conjugate.

$$P_V(t) \propto \left|\exp\left(\frac{i}{\hbar}\int_{time=0}^{time=t} s(\tau) \cdot d\tau\right) \cdot \sin(\theta)\right|^2 \propto \sin^2(\theta)$$

This reveals no information about the phase of the state and is independent of time. It is only the phase between $X_V$ and $X_H$ that will change. Consider the case where a measurement of the final state is made, at a time t, along an angle φ 37 (illustrated in FIG. 3). To do this equation (3) must be rewritten by making the substitution, $$|X_H\rangle = \cos(\phi)|X_\phi\rangle - \sin(\phi)|X_{\phi+\pi/2}\rangle, |X_V\rangle = \sin(\phi)|X_\phi\rangle + \cos(\phi)|X_{\phi+\pi/2}\rangle$$

to obtain $$\Psi(t) = C\left[\begin{array}{c}\cos(\theta)(\cos(\varphi)|X_\varphi\rangle - \sin(\varphi)|X_{\varphi+\pi/2}\rangle) + \\ \exp\left(\frac{i}{\hbar}\int_{time=0}^{time=t} s(\tau) \cdot d\tau\right) \cdot \sin(\theta)(\sin(\varphi)|X_\varphi\rangle + \cos(\varphi)|X_{\varphi+\pi/2}\rangle)\end{array}\right]$$

From which we extract the probability of measuring the state to be along angle φ, $P_\phi(t)$ $$P_\varphi(t) = |\langle X_\varphi | \psi(t)\rangle|^2 \propto \left|\cos(\theta)\cos(\varphi) + \exp\left(\frac{i}{\hbar}\int_{time=0}^{time=t} s(\tau) \cdot d\tau\right) \cdot \sin(\theta)\sin(\varphi)\right|^2$$

And by definition $$P_{\phi+\pi/2}(t) = 1 - P_\phi(t)$$

Thus, through a coherent excitation of both components of the exciton state, for instance by exciting with a bright laser of polarisation that is at some angle to the state polarisations, a superposition state may be prepared. Further, when a measurement is performed that simultaneously measures both of these components of the exciton state, for instance by measuring at an angle to the eigenstate polarisations, the final phase of the superposition state can be measured.

The above will now be described in more detail. To obtain the data shown in FIGS. 4A, 4B and 4C, a superposition state is formed by exciting the quantum dot with a laser using an excitation angle θ. The invention will now be illustrated with reference to some preferred embodiments. Without limiting the invention, we shall focus here on the case where excitation is at an angle of θ=45 degrees to the eigenstates of the dot (which are aligned along H and V of FIG. 3). This prepares a superposition with equal components of $X_H$ and $X_V$. Measurements will be made of the final state at angles of φ=diagonal, D, and antidiagonal, A, at a time t, resulting in probabilities given by $P_D(t)$ and $P_A(t)$. In this embodiment, the final state is read out by measuring the polarisation of the photon which is emitted due to decay of the neutral exciton. As shown in FIG. 1 a polariser in front of the detector aligned along A or D is used measure whether the photon emitted from the exciton state is aligned along that direction.

In FIG. 4A, the superposition is prepared at time zero 41 within a dot with fine structure splitting s=0. A time later which less than the lifetime of the state, and in an embodiment close to time zero, the voltage modulator is used to change the value of s to a non-zero value. From equation (3) it can be seen that a non-zero value of s results in the state evolving over time. A grey area 43 on FIG. 4 highlights the time during which the voltage is modulated. During this time the states evolve with $P_D$ as shown in FIG. 4B falling from unity to zero 45, and $P_A$ as shown in FIG. 4C rising from zero to unity 47. By changing the length and or height of the voltage pulse modulation, any phase change may be achieved. Once the voltage pulse returns the splitting to zero, the states stop evolving over time.

The above voltage modulation can be achieved using a commercially available pulse generator which can supply pulses of length 50 ps or longer. An identical change could be achieved using a voltage modulation with twice the temporal length and half the height, provided the area of the curve under FIG. 4A is preserved.

FIGS. 5A, 5B and 5C show a different situation to that of FIGS. 4A, 4B and 4C. In FIGS. 5A, 5B and 5C, the quantum dot naturally has a small value of fine-structure splitting s. For a fixed value of s (assumed to be 2.5 µeV in FIG. 5A 49) the superposition acquires phase at a constant rate resulting in $p_D = (1+\cos(2\pi st/h))/2$, and $p_A = (1-\cos(2\pi st/h))/2$ as expected. Thus a measurement of the system at a fixed time of 1.6 ns will give $p_D=1$, $p_A=0$.

If a voltage modulation identical to that employed in FIG. 4B were used to change the fine-structure splitting in addition to the fixed value of s=2.5 µeV, (49) the variation in $p_D$ (51) and $p_A$ (53) shown in FIGS. 5B and 5C respectively would be seen. A measurement of the state at a fixed time of 1.6 ns later 55 shows again that the state has been inverted to give $p_D=0$, $p_A=1$.

Experimental measurement of the change in phase of this system with time is shown in FIG. 6 for a constant value of s=2.5 µeV. FIG. 6 shows a plot of the fidelity of the time dependent entangled state compared with the maximally entangled state:

$$\Psi(t) \propto (|HH\rangle + |VV\rangle)/\sqrt{2} \quad (6)$$

The results are plotted as a function of the delay (τ) between the bi-exciton photon and the exciton photon. This experimental data is from Stevenson et al. Physical Review Letters 101, 170501 (2008).

FIG. 7A shows experimental data on the variation in the fine-structure splitting as a function of the vertical electric field for single self-assembled InAs/GaAs quantum dot. Experimentally, it has been found that away from s=0 the application of a vertical electric field leads to a linear change in s 71. This has a gradient of 0.285 µeV kV$^{-1}$ cm for a particular type of quantum dot grown on GaAs emitting at 940 nm. By modification of the shape, size and confinement potential this value can be modified.

At large values of s the two excitonic dipoles tend to be orientated along the crystal axes, Ω=0 (73). As the magnitude of the fine structure splitting falls a minimum, finite splitting caused by anticrossing in the energies of the two states 75 is observed as shown in FIG. 7A. At minimum value of s these states become maximally hybridised creating two orthogonal states that are orientated at Ω=+45 degrees of −45 degrees (77). The plot in FIG. 7B shows how the degree of hybridisation, defined by the angle Ω, varies as we approach the anticrossing. This behaviour is a common feature of InAs/GaAs quantum dots in vertical electric field, but the minimum value of s varies between dots from 0 to 40 µeV. The dotted lines 79 in FIG. 7 show the behaviour of a quantum dot with a zero minimum value of s.

The ability to control the hybridisation of the two states in this manner, allows more complete control the operation that can be performed between the initial and final state.

The data shown in FIGS. 4 and 5 relates to a state which is a superposition of the two eigenstates. In FIGS. 8 and 9, the excitonic state is excited in only one eigenstate, which is a pure state and not a superposition of states. Thus, even in the presence of inherent splitting in the quantum dot, the state will not evolve.

Using the above, it is possible to excite the exciton state into an eigenstate at some finite value of s and still perform an operation on this state.

FIG. 8 illustrates how during some time (grey area) the magnitude of the fine structure splitting and the orientation of the eigenstates can be changed to allow the "pure state" initially formed to be changed to a superposition which can evolve in time.

To obtain the data shown in FIG. 8, a dot may be excited at some finite value of s, into a pure state $X_H$, by exciting with θ=0 at time zero (81). The voltage applied may then minimise s 83, where there will remain a small anticrossing. As is shown in FIG. 7B, under these conditions, the eigenstates of the dot are rotated by 45 degrees.

At this minimal value of s the initially prepared exciton (aligned along H) is in a superposition of the two relevant eigenstates which have been rotated through 45 degrees and are now aligned along D and A. Leaving the system in this state for a predetermined time will allow the superposition to acquire some phase change between these components if s is non-zero as shown in the shaded area of FIGS. 8B and 8C. The voltage can then be returned to the initial value, and the final state measured. By controlling the time at minimal s and the value of the minimal s the final state can be any superposition in the linear basis (with fixed phase), and thus a rotation has been performed.

In FIG. 8, the voltage modulation is applied such that the initially horizontally polarised state switches to a vertically polarised state. When the bias is returned to its original value such that s has a large value the state is stable. The new state at time greater than 0.9 ns in FIG. 8 is stable because the state is vertical and the eigenstates are V/H. Therefore there is no component of the state in the H-eigenstate and it is not possible to measure the relative phase between H and V. If the eigenstates were at, for example, a rotation of 60 degrees and the state was aligned along "V" then "V" would be a superposition of the eigenstates 60 degrees and 150 degrees, which would evolve in time.

FIGS. 9A, 9B and 9C show data concerning an exciton state taken where a dot is prepared at the minimal value of s, into a pure state $X_A$ at time zero 91. The plots illustrate how during some time (grey area) the magnitude of the fine structure splitting and the orientation of the eigenstates can be changed to allow the "pure state" initially formed to be changed to a superposition which can evolve in time.

The voltage applied can increase s (93) and the eigenstates of the dot will be rotated to Ω=90 degrees to be aligned along H and V. At this larger value of s the initially prepared exciton (aligned along D) is in a superposition of the two relevant eigenstates (aligned along H and V). Leaving the system in this state for a predetermined time will allow the superposition to acquire some phase change between these components. The voltage can then be returned to the initial value, and the final state measured. By controlling the time the dot is held at each value of s and the value of s the final state can be any superposition in the linear basis, and thus a rotation has been performed. FIGS. 10A, B and C show data from a quantum dot in a component in accordance with an embodiment of the present invention, which can be used to control the two-photon state of an entangled pair emitted via the exciton-biexciton cascade.

Entangled photon pairs are a resource required for quantum cryptography and optical quantum computing. Quantum dots emitting via the biexciton→exciton→empty cascade naturally emit photons in the entangled state $X^HX_2^H+X^VX_2^V$ when the fine-structure splitting is small compared to the linewidth of the transitions. For applications in quantum key distribution and quantum computing it is advantageous to be able to control the state in which the photons are emitted. This could be achieved using a polarisation rotator in front of the source which rotates only the X photons. However, such mechanical rotations are slow with a typical time scale of milliseconds to seconds. High speed rotations of quantum states are required for feed-forward in quantum teleportation and quantum repeaters. This will be discussed with reference to FIG. 13.

In a component in accordance with an embodiment of the present invention the state in which the photons are emitted is controlled. In this embodiment, the dot is excited to the biexciton state and emits a biexciton photon ($X_2$) at time zero (101), where s is minimal. FIG. 10B plots the fidelity f+ of the emitted two-photon state with the Bell state $X^HX_2^H+X^VX_2^V$, FIG. 10C plots the fidelity f− of the emitted two-photon state with the Bell state $X^HX_2^V+X^VX_2^H$.

If no change is made to the fine-structure splitting the dot will naturally emit in the Bell state $X^HX_2^H+X^VX_2^V$, so f+=1 and f−=0. When a suitable manipulation of the value of s is made 103, leading to a rotation of the X superposition, the system will evolve into the $X^HX_2^V+X^VX_2^H$ state. In general, any manipulation of the state could be made in this time between the biexciton and exciton photon emissions, creating a Bell state determined by the operation performed on s.

Figure 11:
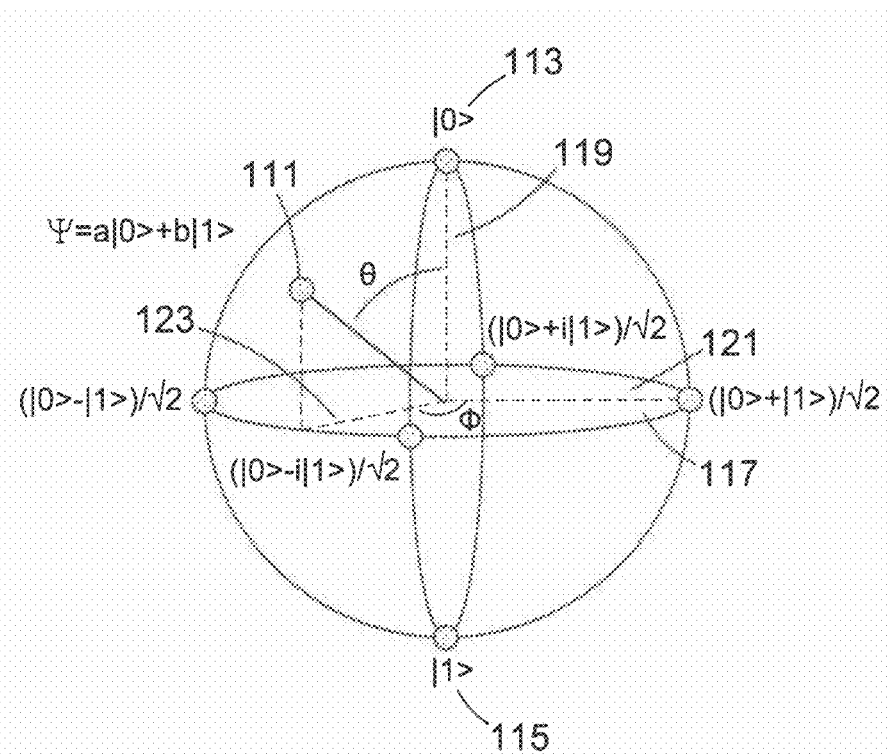
FIG. 11 is a schematic of a general qubit represented by a Bloch sphere.

FIG. 11 illustrates how to use the present invention to transform an arbitrary qubit state to any other arbitrary qubit state. A qubit is quantum superposition of two states, usually denoted by the orthogonal states |0⟩ and |1⟩. In the present scheme the computational basis states |0⟩ and |1⟩ are orthogonally polarised exciton states such as $X_H$ and $X_V$.

Any qubit may be represented by a point 111 on the Bloch sphere, as shown in FIG. 11. The basis states $|0\rangle$ and $|1\rangle$ are represented by the north 113 and south 115 poles of the sphere, and the superpositions $|0\rangle + e^{i\Phi}|1\rangle$ lie on the equator 117. Thus using the rectilinear polarisation computational basis, diagonally and circularly polarised states also lie on the equator.

A general qubit may be represented by $\Psi = a|0\rangle + b|1\rangle$, where $a = \cos(\theta/2)$, $b = e^{i\phi}\sin(\theta/2)$, and $\theta$ and $\phi$ indicate latitude and longitude as shown in FIG. 11. Thus to prepare an arbitrary qubit state from any other requires means to rotate the qubit about at least two axes. Rotation about different axes can be achieved by modulation of the splitting in different polarisation bases.

For example, if the computational basis is the rectilinear polarisation basis, a finite splitting in the rectilinear {H,V} basis will cause a phase difference to evolve between $|0\rangle$ and $|1\rangle$, resulting in a rotation about the vertical axis 119, and a change in longitudinal angle $\phi$. If instead the splitting is in the diagonal basis, then there will be a rotation about the axis containing the diagonal basis states 121, which in this example are represented by the points $(|0\rangle \pm |1\rangle)/\sqrt{2}$ indicated on FIG. 11. This can change the latitudinal angle $\theta$, for example to transform the state H to V, L or R represented in this example by $|1\rangle$, and $(|0\rangle \pm i|1\rangle)/\sqrt{2}$. Similarly a splitting in the circular {L, R} basis will in this example result in rotation about the axis 123 containing points $(|0\rangle \pm i|1\rangle)/\sqrt{2}$.

Using a sequence of splitting control pulses allows any state to be prepared. For example to prepare the state $|D\rangle = (|H\rangle + |V\rangle)/\sqrt{2}$ from the state $|H\rangle$, a first voltage pulse may be applied to create a splitting in the diagonal basis, with sufficient duration for the state to evolve to $|R\rangle = (|H\rangle + i|V\rangle)/\sqrt{2}$. A second voltage pulse may then be applied to create splitting in the rectilinear basis, with sufficient duration for the state to further evolve to $|D\rangle = (|H\rangle + |V\rangle)/\sqrt{2}$.

Alternatively a single pulse may be used, but the splitting basis chosen that the basis states form an axis which intersects the vector from the initial to final qubit state.

Another advantage if the splitting basis can be chosen, is that after preparation of the qubit, control voltages may be applied to select a splitting basis so that the prepared qubit is a basis state. In this case no further evolution of the qubit will occur before the photon is emitted.

Control of the splitting in the rectilinear basis may be achieved by a modulation of the electric field in the vertical direction of the sample, or in the plane of the sample along the directions corresponding to H or V polarisation, usually substantially equal to [110] and [1-10]. Control of the splitting in the diagonal basis may be achieved by using a quantum dot with finite minimum splitting, where the basis states are predominantly diagonal. Increasing the splitting using a modulation of the electric field in for example the vertical direction causes the splitting in the rectilinear basis to dominate. Alternatively splitting in the diagonal basis may be achieved by modulation of the electric field in the plane of the sample, along the axes corresponding to the polarisation states D or A. Finally control of the splitting in the circular basis may be applied by applying vertical magnetic field at the quantum dot, for example by passing current through an external coil.

Figure 12:
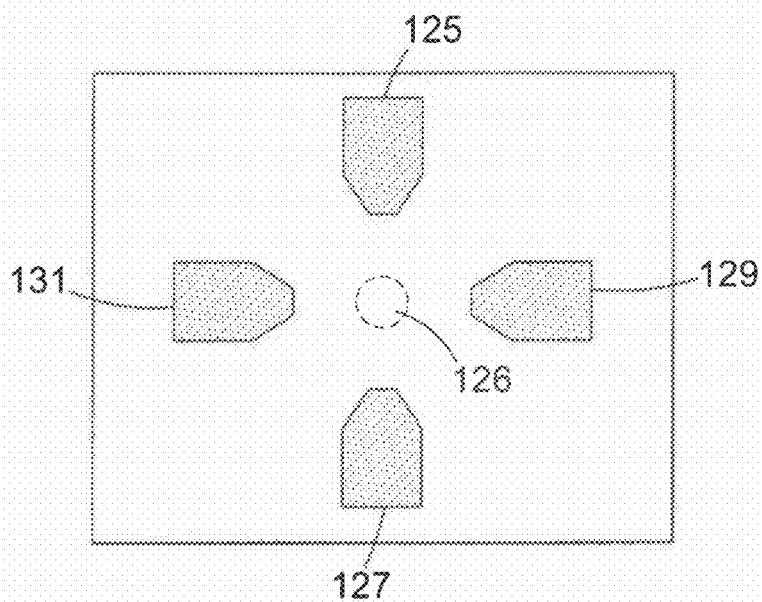
FIG. 12 is a schematic of a component in accordance with an embodiment of the present invention allowing the control of fine structure splitting in multiple bases.

FIG. 12 is a component in accordance with a further embodiment of the present invention. FIG. 12 shows a surface of the component with quantum dot 126 provided just below the surface. For example, the quantum dot may be an InAs quantum dot in a GaAs layer.

Two pairs of surface contacts are formed. The contacts may, for example, be Schottky contacts. The first pair of contacts 125 and 127 are arranged to form a line with said quantum dot and are formed on either side of said quantum dot 126. The second part of contact, 129 and 131 are also formed in a line with said quantum dot 126 and are formed on either side of said quantum dot. The line of the first pair of contacts is perpendicular to the line formed by the second pair of contacts. Both pairs of contacts provide a lateral field across said quantum dot 126.

In the component shown in FIG. 12 the arrangement of electrical contacts on the surface of a device allows control of the splitting in more than one basis using voltage modulation. Such control will allow any qubit rotation to be achieved.

The above is one example, a further set of contacts may be provided to apply a vertical field of the type described with reference to FIG. 1.

To achieve splitting in the circular basis, a magnetic field may be applied to the quantum dot perpendicular to the sample surface. The magnetic field causes a spin dependent energy splitting of the exciton states, known as Zeeman splitting, and thus increases the fine structure splitting between oppositely circularly polarised exciton states as desired. Typical Zeeman splittings measured previously for similar quantum dots are of the order $|s| \sim 200$ $\mu eVT^{-1}$. Thus to achieve significant splitting of $\sim 2$ $\mu eV$ requires a field of 0.01 T. This is a small magnetic field that can be routinely achieved by passing current through an external coil.

To achieve splitting in the rectilinear and diagonal bases FIG. 12 depicts an embodiment where two pairs of contacts are arranged around the quantum dot on the surface of the device so that an electric field may be applied in any direction in the plane of the sample. For example applying a positive voltage to the top contact T 125 with respect to the bottom contact B 127 will cause an electric field between the top and bottom contacts T 125 and B 127. The electron and hole wavefunctions to spatially separate in the quantum dot along opposite directions of the electric field. This results in a stronger change in the electron hole overlap in the direction of the field compared to the orthogonal in-plane direction, which will change the fine structure splitting $|s|$ in the rectilinear polarisation basis (assuming the top and bottom contacts T 125 and B 127 are aligned along H or V polarisation directions), By application of a voltage equally to the top and right contacts T 125 and R 129, and a second voltage equally to the bottom and left contacts B 127 and L 131, an electric field may be generated in an orientation 45° to the previous example, corresponding to the D or A polarisation direction. Such a field would produce a fine structure splitting in the diagonal basis. A field of arbitrary strength and in-plane direction may therefore be applied by controlling the relative voltages applied to each of the four contacts, resulting in a fine structure splitting in an arbitrary basis.

By application of voltage pulses to at least one contact, and further voltage pulses or fixed voltages to other contacts, it is therefore possible to produce a fine structure splitting with arbitrary linear basis using the contact arrangement depicted in FIG. 12. Splitting in a completely arbitrary basis may be achieved by passing a current through an external wire coil to induce a magnetic field normal to the device surface.

FIG. 13 is a schematic of a component in accordance with a further embodiment of the present invention configured for teleportation of a state of an input photon (qubit) 133 to an output photon (qubit) 135.

Teleportation can be used for a variety of quantum information applications, including in linear-optical quantum computing which can use teleportation to provide the input state to a probabilistic quantum logic gate after the outcome of the gate is determined to be a success. Operation of the teleportation system is described as follows.

The system requires a quantum dot photon pair source which is provided by a component as described with reference to FIG. 1 in accordance with an embodiment of the present invention. The quantum dot within the component is, excited to the neutral biexciton state using an optical laser pulse 137. The biexciton (XX) state decays to the exciton (X) state emitting a first biexciton (XX) photon 139 from the component. The emitted biexciton (XX) photon 139 is entangled with the exciton (X) 141 state that remains in the quantum dot.

A joint measurement is performed on the state of said biexciton (XX) 139 photon and an addition input photon 133, whose polarisation represents the input qubit state. This joint measurement is known as a Bell state measurement 143, and can differentiate between the four well-known entangled Bell states. The measurement is performed in a mixing unit 143 which outputs a signal dependent on the Bell measurement to the voltage modulator 145.

After the Bell state measurement, the exciton X 141 that remains in the component has a fixed relationship to the input photon 133, dependent on which of the four Bell states was detected. Rotation of the exciton (X) qubit can be achieved by one or more voltage pulses from voltage modulator 145 that change the electric field across the dot in one or more directions. This has the effect of changing the fine structure splitting in order to accrue phase difference between orthogonally polarised components of the exciton (X) qubit 141. Each of the four Bell state measurements will trigger a different voltage pulse or pulse sequence, ensuring that the exciton (X) qubit maximally represents the state of the input photon qubit.

For example, if the input photon is a superposition of H and V and the entangled state is $X^H X_2^H + X^V X_2^V$. The input photon and the biexciton photon are compared in the "Bell State Measurement" performed by the mixing unit to see if they are the same or different (without actually determining whether they are H or V). If the input photon and the biexciton photon are the same, then the mixing unit indicates to the voltage modulator that nothing needs to be done to the stored X state and thus let it emit a photon of the same polarisation as the biexciton. Therefore, the input and exciton photons are the same. However, if the Bell State Measurement indicates that the input and biexciton are opposite, the mixing unit indicates to the voltage modulator that a pulse should be applied to the stored exciton state to change H to V and V to H, this will then make the exciton photon emitted the same as the input photon.

Following the exciton (X) qubit rotation the exciton (X) 141 recombines to emit the output exciton photon 135. This output photon qubit 135 has substantially the same quantum state as the input photon qubit 133. Thus the state of the input photon 133 has been teleported onto the state of the output photon 135.

Note that it is advantageous for the biexciton (XX) lifetime to be short, and the exciton (X) lifetime to be long. This can be achieved by cavity quantum electro dynamics and a strong optical mode resonant with the XX photon, as described with reference to FIGS. 1, 15 and 16. Variations on this embodiment may include excitation using an electrical current.

FIG. 14 shows a component in accordance with an embodiment of the present invention in which a controlled-NOT logic operation can be achieved. In a CNOT gate, an input/output qubit is flipped if and only if a further qubit (the control qubit) is 1.

The quantum dot is excited into the biexciton (XX) state at time zero 151 and decays via emission of a biexciton XX photon whose polarisation is correlated with the exciton state the remaining electron-hole pair in the dot is projected into.

Thus the initial state $\Psi_\alpha$ following such an XX photon emission event (written in the rectilinear {H,V} polarisation basis) is;

$$\Psi_\alpha = (|H_{XX} X_H\rangle + |V_{XX} X_V\rangle)/\sqrt{2}$$

where $H_{XX}$ and $V_{XX}$ denote the horizontally and vertically polarised biexciton XX photons, and $X_H$ and $X_V$ denote the exciton X states that decay to emit horizontally and vertically polarised photons.

After a time $T_m$, denoted in FIG. 14A by a vertical line 153, a voltage modulation is applied to the device in order to modify the fine structure splitting |s| for a short time 155, as shown schematically in FIG. 14B. Here we assume the typical case where the fine structure splitting results in H and V polarised eigenstates, though other configurations are possible. During the voltage modulation pulse, a phase difference $\Phi$ is acquired between $X_H$ and $X_V$. In an embodiment, the phase difference $\Phi$ should be close to $\pi$, which can be achieved by choosing appropriate amplitude and duration of the voltage modulation. Following the voltage modulation, the acquired phase projects the system into the state $\Psi_{159}$, given by:

$$\Psi_\beta = (|H_{XX} H_H\rangle + e^{i\Phi} |V_{XX} X_V\rangle)/\sqrt{2}$$

$$\Psi_\beta = (|H_{XX} H_H\rangle - |V_{XX} X_V\rangle)/\sqrt{2}$$

The above equation reveals that the nature of the entanglement is different depending on when the exciton photon is emitted (or equivalently measured). For example, if the exciton time measurement falls within the region 157, then the symmetric Bell state $\Psi^+ = \Psi_{157}$ is formed. However, if the measurement time falls within the region 159, we have the anti-symmetric Bell state $\Psi^- = \Psi_{159}$. This state is orthogonal to $\Psi^+$, which means the fidelity $f^+$ of the exciton-photon system to $\Psi^+$ falls from a maximum of 1 to a minimum of 0 following application of the voltage modulation 161. This is shown schematically in FIG. 14C.

In an embodiment, the probability of a photon being emitted prior to the voltage modulation is equal to the probability of a photon being emitted after the modulation. For a state with a single radiative decay time T a modulation at a time $T_m$ 153 equal to $-T \cdot \ln(\frac{1}{2})$ may be applied. For a typical InAs/GaAs QD which is not in a cavity, T=1 ns, so the modulation should be applied at 0.69 ns.

As the emission time of the exciton photon is uncertain, the system state $\Psi$ is described by a superposition of the states before and after the modulation, $\Psi_\alpha$ and $\Psi_\beta$ as follows:

$$\Psi = \Psi_\alpha |\alpha\rangle + \Psi_\beta |\beta\rangle /\sqrt{2}$$

$$\Psi = (|H_{XX} H_X \alpha\rangle + |V_{XX} V_X \alpha\rangle + |H_{XX} H_X \beta\rangle - |V_{XX} V_X \beta\rangle)/2$$

where $|\alpha\rangle$ and $|\beta\rangle$ denote the time region for emission of the horizontally and vertically polarised exciton photons $H_X$ and $V_X$. The choice of $T_m$ 153 ensures the superposition is equally balanced. The above equation can be rewritten in the diagonal polarisation basis {D,A} using the substitutions $|H\rangle = (|D\rangle + |A\rangle)/\sqrt{2}$ and $|V\rangle = (|D\rangle - |A\rangle)/\sqrt{2}$ as follows:

$$\Psi = (|D_{XX} D_X \alpha\rangle + |A_{XX} A_X \alpha\rangle + |D_{XX} A_X \beta C + |A_{XX} D_X \beta\rangle)/2$$

Inspection of the above equation reveals that measurement of the time and polarisation of the exciton photon can be used to perform a quantum logic operation affecting the polarisation state of the emitted biexciton XX photon. This is due to the fact that the polarisation of the biexciton XX photon is the same or opposite to that of the exciton X photon dependent on the measurement time of the X photon.

Consider the emission (detection) time measurement of the exciton X photon to represent a control qubit with logical 0=$\alpha$, and 1=$\beta$, and the polarisation measurement of the exciton photon to represent an input qubit with logical 0=H, and 1=V. Similarly the biexciton photon represents the output qubit also with logical 0=H, and 1=V. Thus the system inverts the state of the input qubit conditional on the state of the control qubit, and outputs the result to the output qubit. So for a control qubit=|0⟩, the output qubit is equal to the input qubit. However, for a control qubit=|1⟩, the output is |1⟩ for input |0⟩, and the output is |0⟩ for input |1⟩.

The behaviour of this quantum logic operation is similar to a CNOT gate.

In practical terms many biexciton decays would be measured and afterwards, the data would be sorted to determine that photons emitted at time alpha are in one state, time beta in another.

Also like a CNOT gate, the input, control and output qubits can be in states that are superpositions of logical |0⟩ and |1⟩. For polarisation encoded qubits this means a polarisation other than H or V, and for the time encoded qubit an interferometer may be used to measure a superposition of two emission times.

The type of logic gate described here is probabilistic in the sense that the input qubits are not chosen directly, but selected when the measurement of polarisation and time of the exciton photon yields the desired result. In addition unlike a conventional CNOT gate, the control qubit is destroyed during the logic operation and therefore cannot be subsequently reused or measured. In other words, it is that the time of emission is quantum mechanically uncertain and measurement "collapses" the wavefunction at that time and destroys it. At this point it is no longer a superposition of the two times, it is definite that a detection occurred, and the qubit is destroyed. This is not true for the output qubit which does not need to be measured in order for the logic operation to be successful.

Figure 15:
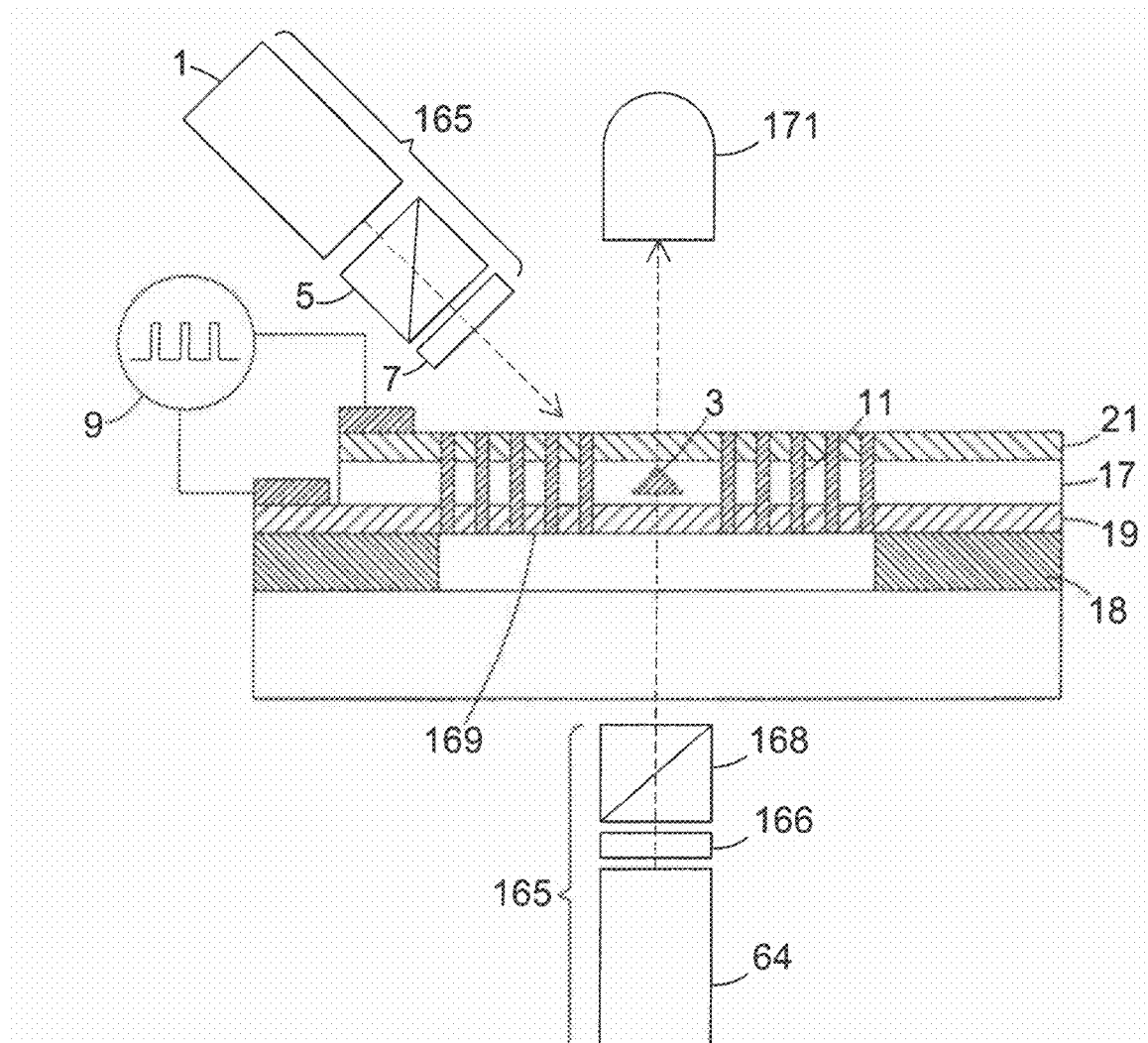
FIG. 15 shows a component in accordance with an embodiment of the present invention where a bright optical beam is perturbed by the state of the quantum dot.

FIG. 15 shows a component in accordance with an embodiment of the present invention. In this embodiment, the state of the qubit is read by monitoring a modulation in the transmittance of a reading beam transmitted through the component.

The structure of the device is identical to that described with reference to FIG. 1. Therefore, to avoid any unnecessary repetition, like reference numerals have been used to denote like features.

As in FIG. 1, the photons are excited in the quantum dot 3 using a laser 1 direct onto the quantum dot through first a polariser 5 and then a wave plate 7. The wave plate allows the plane of polarisation to be rotated.

The readout part of the system comprises unit 167. Unit 167 comprises laser 164 which is passed through wave plate 166 which is then passed through second polariser 168.

In this embodiment, the wave plate is placed before the polariser in the reading system. This is standard practise. If the dot emits a H photon and the waveplate does not rotate it, the polariser will pass this to the detector if it is configured to transmit H photons. Any V photon emitted by the source will be blocked. However, if the (half) waveplate is rotated 45 degrees it will rotate a V photon to H, where it will pass through the polariser and be detected. H photons emitted by dot will be rotated to V and blocked by the polariser. Thus it is easy to measure any polarisation by rotating the waveplate to an appropriate value.

The laser 167 is a bright coherent laser with a line width equal to or less than that of exciton state which emits at an energy equal to that of the exciton state. The laser is directed onto quantum dot 3 and passes through the structure to detector 171. Detector 171 is an intensity detector.

If the laser is polarised parallel to the state at the time the laser passes the sample, the laser may be scattered by the exciton. This will perturb the signal detected by the detector 171. In the alternative case where the exciton is orthogonal to the bright laser polarisation the signal detected by 171 will not be perturbed. Thus a measurement has been performed on the exciton state, which may "collapse" the exciton state superposition, and the state will be projected onto the orientation of the laser. In this measurement technique the exciton is not destroyed (as in photon emission).

Figure 16:
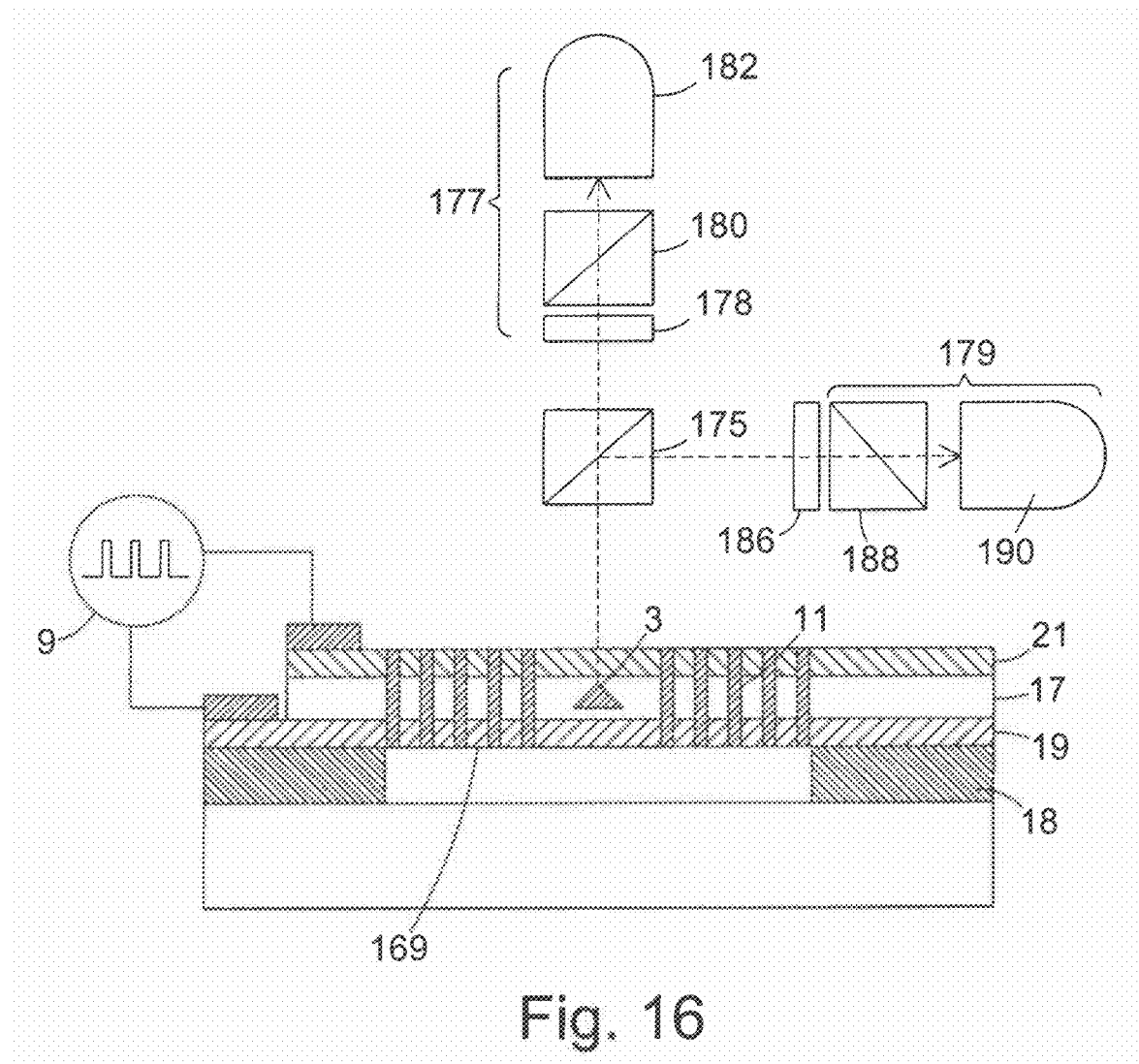
FIG. 16 shows a component in accordance with an embodiment of the present invention where the dot is excited to the biexciton state, and decays via the emission of two photons which are detected by a pair of polarisation sensitive detectors.

FIG. 16 shows a component in accordance with a further embodiment of the present invention. The semiconductor structure of the component is the same as that described with reference to FIG. 1. Therefore, like reference numerals will be used to denote like features.

However, the voltage modulator is configured both to apply a modulation over a timescale faster than the neutral exciton decay in the quantum dot 3 and to excite a photon into the quantum dot. This can be achieved by applying a larger bias such that carriers are supplied to the quantum dot from either the n or p type regions.

Upon excitation of the dot 3 to the bi-exciton level by current injection, the first photon emitted is directed using dichroic beamsplitter 175 or another type of wavelength dependent device towards polarised detection system 177. In the polarised detection system 177, there is a wave plate 178 which serves to select the measurement basis for a polarisation measurement, a polariser 180 which then only passes photons with a particular polarisation and a detector 182.

The second photon is directed by dichoric beamsplitter 175 into second detection system 179. Second detection system 179 comprises a wave plate 186, a polariser 188 and a detector 190. These operate in the same manner as described with reference to the first detection system 177.

Figure 17A:
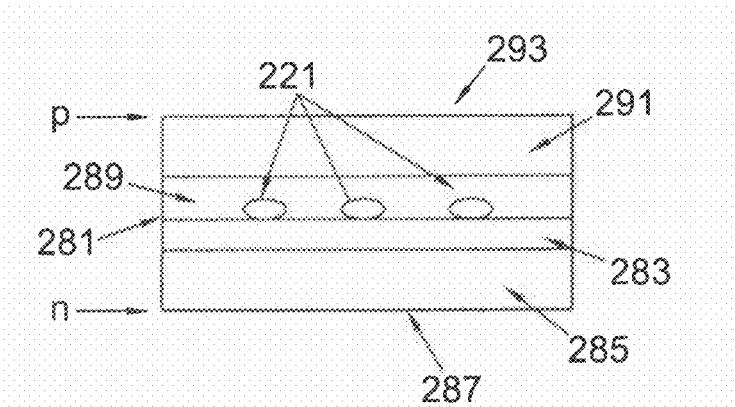
FIG. 17A is a layer structure for use in a component in accordance with an embodiment of the present invention and FIG. 17B is the corresponding band diagram.
Figure 17B:
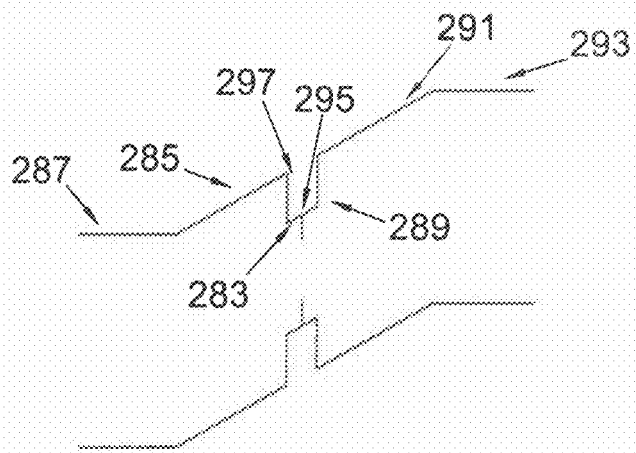

FIG. 17A and its corresponding band diagram FIG. 17B illustrate a layer structure of a component in accordance with a further embodiment of the present invention. Contacts, an excitation portion and a measuring unit are not shown.

In FIGS. 17A and 17B, barrier layers are provided and are configured to prevent tunnelling of the carriers out of the quantum dot before recombination. This structure can allow higher fields to be provided across said quantum dot.

In the embodiment of FIGS. 17A and 17B, a plurality of quantum dots 221 are formed at an interface 281 between a lower Gallium Arsenide layer 283 and an upper Gallium Arsenide layer 289. The upper 289 and lower 283 Gallium Arsenide layers are in contact with upper 291 and lower 285 barriers layers respectively. The upper and lower barrier layers 285 and 291 are higher band gap layers which may for example be AlGaAs. This arrangement with the upper and lower Gallium Arsenide layers 289 and 283 sandwiched between the upper and lower barrier layers 291 and 285 result in the Gallium Arsenide layers forming a quantum well.

The barrier layers are provided close enough to the interface 281 where the quantum dots are formed such that they provide a further degree of electrical confinement than if the barrier layer were not present. The GaAs layers between the barrier layers forms a quantum well.

The corresponding band diagram is shown in FIG. 17B. Here, the quantum dot 295 is located in quantum well 297 which is formed by upper and lower GaAs layers 289 and 283. This is then formed between upper and lower barrier layers 291 and 285 which serve to suppress tunnelling from the quantum dot.

As the quantum dots in the above design are formed in GaAs, the properties of the quantum dots are well understood since this is a typical material of forming the quantum dots.

By using the barrier material, tunnelling is suppressed from the quantum dot for longer which enhances the emission efficiency of the photon emitter. This can lead to tuning over a wavelength range of more than 14 nm as greater than 400 KV/cm of field may be applied without destroying emission efficiency.

In FIGS. 17A and 17B, the structure is a p-i-n structure with one side of the device being p-type and the other side n-type with the dot located in the undoped region. However, similar results would be obtained with n-i-p, n-i-n, p-i-p or ohmic-i-schottky devices provided that the quantum dot and barriers are configured in a similar fashion.

In the embodiment shown in FIG. 17 a particular case is shown where the barriers are equal and the spacing between them small enough to lead to quantisation of the electronic states within the "quantum well". This occurs when the carriers are confined within a sufficiently strong potential to a region comparable to the de Broglie wavelength of the particles.

FIG. 17 shows barriers on either side of the dot to suppress tunnelling of carriers out of the dot. In an embodiment, the height, position or thickness of one or both of these barriers is selected such that the distance from the dot to the barrier is small enough that there is not a confined state at the edge of the barrier where carriers could tunnel to, leaving the dot. Electrons and holes (which have different effective masses) will have equal tunnelling rates for unequal heights of barrier on either side of the dot. In further arrangements, only one barrier is provided. If one barrier is provided in an embodiment it is provided to prevent electron tunnelling.

Examples of fabrication techniques which may be employed in the above structures are taught in GB2380605 which is herein incorporated by reference.

While certain embodiments have been described, these embodiments have been presented by way of example only, and are not intended to limit the scope of the inventions. Indeed, the novel components and method described herein may be embodied in a variety of other forms; furthermore, various omissions, substitutions and changes in the form of the components and methods described herein may be made without departing from the spirit of the inventions. The accompanying claims and their equivalents are intended to cover such forms or modifications as would fall within the scope and spirit of the inventions.

The invention claimed is:

1. A component comprising a qubit and a controller for said qubit, said component comprising a quantum dot and an excitation portion configured to produce a neutral exciton state in said quantum dot to form said qubit, the component further comprising a measuring unit to make an optical measurement relating to the orientation of said state, wherein said controller comprises voltage source coupled to electrical contacts configured to apply a modulated electric field across said quantum dot, wherein the modulation is faster than a decay time of said neutral exciton state.

2. A component according to claim 1, wherein said controller is configured to apply a predetermined phase change to said state, an amplitude of said modulation being selected such that said phase change occurs over a time scale faster than the decay time of said exciton state.

3. A component according to claim 1, wherein said excitation portion is configured to produce a neutral exciton state which occupies a superposition of states and wherein said controller varies the state by varying fine structure splitting of said quantum dot.

4. A component according to claim 3, where the fine-structure splitting is below a radiative bandwidth of the exciton state at a time when the superposition is created.

5. A component according to claim 3, when the fine-structure splitting is below 10 μeV at a time the exciton state is created.

6. A component according to claim 1, wherein said excitation portion is configured to produce a pure eigenstate and said controller varies the state by rotating eigenstates of said quantum dot.

7. A component according to claim 1, wherein the quantum dot is located within a photonic crystal that increases a radiative lifetime of the state.

8. A component according to claim 1, wherein the excitation portion provides optical excitation and said optical excitation is an integer number of phonon energies greater than energy of the exciton state.

9. A component according to claim 1, wherein the excitation portion provides optical excitation and said optical excitation is at a same energy as the exciton states.

10. A component according to claim 1, wherein a voltage modulator is configured to apply a bias with an amplitude such that the magnitude of the fine structure splitting of the quantum dot is modulated and eigenstates of the quantum dot are constant in time.

11. A component according to claim 1, wherein a voltage modulator is configured to apply a bias with an amplitude such that a magnitude of fine-structure splitting of the quantum dot is modulated and exciton eigenstates are rotated.

12. A component according to claim 1, wherein the excitation portion is configured to excite a biexciton state in said quantum dot, said neutral exciton being formed by decay of said biexciton.

13. A component according to claim 1, wherein the quantum dot is provided in a structure comprising a plurality of layers and a voltage modulator is configured to apply a vertical electric field which is perpendicular to a plane of said layers.

14. A component according to claim 1, wherein the quantum dot is provided in a structure comprising a plurality of layers and a voltage modulator is configured to apply a lateral electric field which is parallel to a plane of said layers.

15. A component according to claim 1, wherein the quantum dot is provided in a structure comprising a plurality of layers and the controller further comprises a magnetic field generator configured to apply a vertical magnetic field configured to manipulate fine-structure splitting of said quantum dot.

16. A component according to claim 1, wherein said measuring unit comprises a polariser arranged to make a polarisation sensitive measurement.

17. A component according to claim 1, wherein said measuring unit comprises a laser beam resonant with the exciton state and directed to said quantum dot and a photo-detector configured to determine if the laser beam has been affected by the quantum dot.

18. A component according to claim 1, the component further comprising an independent photon source configured to produce a photon, wherein the excitation portion is configured to excite a biexciton in said quantum dot, the component further comprising a photon mixing unit configured to mix the photon from the independent source with the photon emitted from bi-exciton decay such that a Bell state measurement is performed on the two photons, said photon mixing unit further comprising an output unit configured to output a signal to said controller indicating the Bell state, said controller being configured to change the state of said neutral exciton to that of said independent photon on the basis of the signal received from the photon mixing unit.

19. A component according to claim 1, configured as a CNOT gate, wherein said excitation portion is configured to excite a biexciton in said quantum dot, said controller is configured to apply a modulating pulse to apply a phase change of pi to the neutral exciton state, such that the polarisation state of an exciton photon is entangled with an emission time, and measurement of the time and polarisation of a exciton photon determines the polarisation of a biexciton photon.

20. A method of controlling a qubit in a quantum dot, said method comprising forming a qubit by providing a neutral exciton state; controlling said qubit by applying a modulated electric field across said quantum dot, wherein the modulation is faster than a decay time of said neutral exciton state; and making an optical measurement relating to an orientation of said state.

* * * * *